United States Patent [19]
Boulos et al.

[11] Patent Number: 5,962,356
[45] Date of Patent: Oct. 5, 1999

[54] DARK BRONZE GLASS WITH IMPROVED UV AND IR ABSORPTION AND NITRATE-FREE MANUFACTURING PROCESS THEREFOR

[75] Inventors: Edward Nashed Boulos, Troy, Mich.; James Victor Jones, Toledo, Ohio

[73] Assignee: Ford Motor Company, Dearborn, Mich.

[21] Appl. No.: 09/048,757

[22] Filed: Mar. 26, 1998

[51] Int. Cl.$^6$ ..................... C03C 3/081
[52] U.S. Cl. ............... 501/70; 501/71; 501/905; 501/904
[58] Field of Search ............... 501/70, 71, 905, 501/904

[56] References Cited

U.S. PATENT DOCUMENTS

| | | |
|---|---|---|
| 3,296,004 | 1/1967 | Duncan . |
| 3,481,750 | 12/1969 | Swain . |
| 3,844,796 | 10/1974 | Jasinski . |
| 4,101,705 | 7/1978 | Fischer et al. . |
| 4,104,076 | 8/1978 | Pons . |
| 4,190,452 | 2/1980 | Fischer et al. . |
| 5,264,400 | 11/1993 | Nakaguchi et al. . |
| 5,346,867 | 9/1994 | Jones et al. . |
| 5,352,640 | 10/1994 | Combes et al. . |
| 5,380,685 | 1/1995 | Morimoto et al. . |
| 5,521,128 | 5/1996 | Jones et al. ............... 501/71 |
| 5,545,596 | 8/1996 | Casariego et al. . |
| 5,565,388 | 10/1996 | Krumwiede et al. . |
| 5,656,560 | 8/1997 | Stotzel et al. . |

FOREIGN PATENT DOCUMENTS

| | | |
|---|---|---|
| 0 790 219 A1 | 8/1997 | European Pat. Off. . |
| 2 162 835 | 2/1986 | United Kingdom . |

*Primary Examiner*—Karl Group
*Attorney, Agent, or Firm*—Lorraine S. Melotik

[57] ABSTRACT

The invention is a dark bronze soda-lime-silica glass composition having excellent ultra violet and infra red absorbing ability. The colorants of the glass composition consist essentially of: greater than 0.5% total iron oxide as $Fe_2O_3$ with a maximum of 1.5% $Fe_2O_3$, wherein the redox ratio of FeO/total Fe as $Fe_2O_3$ is less than 0.26; 0.10 to 1.00 wt. % manganese compound as $MnO_2$; 0.0005 to 0.004 wt. % selenium as Se; up to 0.016 wt. % cobalt oxide as Co; 0–1.0 wt. % $TiO_2$, the glass composition having, at 4.0 mm. thickness: 570–585 dominant wavelength, 5–30% purity of excitation, 20 to 65% light transmittance using Illuminant A (LTA), less than 35% ultra violet transmittance measured over 300–400 nm, and less than 46% infra red transmittance measured over 760–2120 nm. At 20–50% LTA, the excitation purity is 7–30%, while above 50% LTA, the excitation purity is 5–20%. This glass is particularly useful for architectural applications.

11 Claims, No Drawings

DARK BRONZE GLASS WITH IMPROVED UV AND IR ABSORPTION AND NITRATE-FREE MANUFACTURING PROCESS THEREFOR

The invention is directed to a glass composition having a relatively dark bronze color which may be obtained without a surface coating, which bronze glass has improved UV and IR absorption and shading coefficient and may be manufactured without the use of nitrates. More particularly, it is a soda-lime-silica glass whose colorants are iron oxide, selenium, manganese oxide, and optionally cobalt oxide and titanium oxide.

BACKGROUND OF THE INVENTION

Bronze glass has found particular utility for architectural applications as building glass and has been considered for automotive glass applications. Glass is generally defined by certain spectral properties like dominant wavelength, excitation purity, and light transmission. The lower the excitation purity of a color, the closer it is to being a so-called neutral color which does not distort the hues of objects seen through it.

Those skilled in the art know that dominant wavelength, purity and light transmission all vary unpredictably with one another. Consequently, developing a new glass composition having a particular color, purity and light transmission value may be difficult. For example, an experimental change in the amount or relative proportions of one or more colorants in a glass composition intended to bring one of these numerical values closer to a target value may cause one or both of the other values to drift off target.

Numerous patented bronze glasses which have been manufactured using as colorants iron oxide, cobalt oxide, chromium oxide and selenium or nickel oxide. Still other significantly different colored patented glasses have also been made from these same colorants, as would be appreciated, however, in different colorant proportions. And yet these different colored glasses can include one or more of these colorants in the same amount. For example, increasing the amount of cobalt in a brown or bronze glass made from iron oxide, cobalt oxide, and selenium, results in a blue glass. The difference is the spectral properties including color of the resultant glass is thus closely related to the specific proportions of the colorants in the glass. Hence, those skilled in the art appreciate the unpredictable and time consuming effort required to formulate new glass compositions.

Bronze glasses have been developed using the colorants defined above, where the selenium or nickel oxide imparts a bronze color. However, the inclusion of nickel oxide as a colorant is generally undesirable because it can lead to the formation of nickel sulfide stones during the melting process which can later affect the quality of the glass. Nickel free bronze glass have been proposed, e.g., in U.S. Pat. No. 3,296,004 ('004), U.S. Pat. No. 5,565,388 ('388), and U.S. Pat. No. 5,656,560 ('560). The '004 patent discloses a brown glass whose colorants consist essentially of: iron oxide, cobalt oxide and selenium, while the '388 patent discloses a high transmittance bronze glass whose colorants consist essentially of iron oxide, and selenium with optionally cobalt oxide, nickel oxide, or chromium oxide. Patent '560 also discloses a light bronze-tinted or grey-tinted glass, in this instance containing a high level (0.5–2.0 wt. %) of manganese oxide as colorant and optionally one or more of the following colorants: iron oxide, vanadium oxide, nickel oxide, copper oxide, and cobalt oxide. As discussed above, similar colorants, but in different proportions can lead to different glass colors as seen from U.S. Pat. No. 5,346,867 disclosing a neutral grey glass which contains iron oxide, cobalt, selenium and manganese oxide as colorants. Another nickel-free glass is disclosed in U.S. Pat. No. 4,104,076. It uses iron oxide and cobalt oxide with optional chromium oxide, uranium oxide, and selenium as colorants to make a bronze or gray colored glass.

Still other U.S. patents disclose bronze glass. For example, U.S. Pat. No. 4,101,705, discloses an automotive glass product with high transmittance and a neutral bronze color employing iron oxide and selenium as essential colorants and optionally any combination of cobalt, nickel, or chromium oxides colorants. U.S. Pat. No. 4,190,452 generates a bronze colored glass product using iron oxide and selenium with optional quantities of cobalt oxide, nickel oxide, and chromium oxide as colorants. Another bronze colored glass product is taught in U.S. Pat. No. 5,380,685 using the colorants of iron oxide, cerium oxide, cobalt oxide and selenium.

U.S. Pat. No. 3,481,750 discloses a special method of making a different type of brown colored glass that is termed an amber glass using high levels of colorants of iron oxide, manganese oxide, and cerium in a frit mixture that is intended to be added late in the process of glass making in the forehearth of a glass tank that makes bottles. Another different color of brown glass is disclosed in U.S. Pat. No. 3,844,796 where low concentrations of iron oxide with manganese and chromium oxides are used to make a chocolate brown colored glass for bottles, pressed ash trays, glasses and the like.

Generally, bronze architectural glasses are manufactured by coating a high transmittance, light bronze colored glass with a coating to darken it and to filter out visible, UV and IR radiation. As would be appreciated, reducing transmission of this radiation is particularly necessary if the glass is to be used in high sunshine geographic areas. As would be appreciated, applying such a coating adds another step to the glass manufacturing process and can introduce quality control issues for the coating in the final product.

We have invented a new dark bronze glass composition different from those described above which includes specifically defined amounts of iron oxide, manganese oxide, selenium, and optionally cobalt oxide as colorants. This new dark bronze glass has improved UV and IR absorbing properties and is particularly useful for architectural applications. In addition, the new glass has defined spectral properties including dominant wavelength (color). The pleasing relatively dark bronze color is able to be obtained without adding undesirable colorants like nickel oxide or chromium oxide to the glass, and without the necessity for an applied surface coating to enhance the dark bronze color and improve the UV and IR absorbing properties. And we have found that the bronze glass desirably can be manufactured without the use of nitrates often added when oxidizing conditions are desired in the furnace during glass melting. It is known that the use of nitrates can contribute to NOx emissions.

Advantageously, we have also found that the particular claimed formulation of the invention glass allows for increased amounts of iron oxide to be included in the glass without darkening the color, while at the same time increasing the UV and IR absorbing properties of the glass. As would be appreciated, the UV and IR light absorption properties of a glass are especially valuable when the glass is used for buildings. When heat is absorbed by the glass, the load on building air conditioners is reduced and when the ultra violet absorption is improved, there is less damage over time to the colors of articles inside the building, additionally providing for more occupant comfort. Therefore, controlling these spectral properties of the glass is very important. These spectral properties of the present invention dark bronze glass are particularly useful in sunny geographic areas, i.e., light is allowed to enter but more of the UV and IR radiation is filtered out by the glass. Hence, the present invention dark bronze glass overcomes the deficiencies of prior art glasses and is particularly useful as architectural glass and its method of manufacture provides additional benefits as will be explained in more detail below.

SUMMARY OF THE INVENTION

The present invention is a dark bronze soda-lime-silica glass composition having at a 4.0 mm. thickness: 570–585 dominant wavelength, 5–30% purity of excitation, 20–65% light transmittance using Illuminant A, less than 35% ultra violet transmittance measured over 300–400 nm and less than 46% infra red transmittance measured over 760–2120 nm. More particularly, when the % LTA is 20–50%, the excitation purity is 7–30%, and above 50% LTA, the excitation purity is from 5–20%. The bronze composition comprises by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: greater than 0.5 to 1.5 wt. % total iron oxide as $Fe_2O_3$, wherein the ratio of wt. % FeO/wt. % total iron as $Fe_2O_3$ is below 0.26; 0.1 to 1.0 wt. % manganese oxide as $MnO_2$; 0.0005 to 0.004 wt. % selenium as Se; 0.0 to 0.016 wt. % cobalt oxide as Co, and 0–1.0 wt. % $TiO_2$.

Advantageously the dark bronze glass composition has improved UV and IR absorption and a good shading coefficient, and obtains these properties without the addition of a coating to the glass surface or costly UV improving additives often added to glass like cerium oxide. And this composition can be manufactured with little or no added nitrate which reduces NOx emissions.

According to another aspect of the invention, it is a commercially desirable method for manufacturing a dark bronze glass composition without the addition of a nitrate as a batch component generally added to encourage oxidizing conditions in the glass melt. This method allows for a bronze glass to be manufactured where additional amounts of added iron oxide do not result in a commensurate decrease of visible light transmission yet the additional iron oxide improves the UV and IR absorbing properties of the glass. It is known that usually adding more iron oxide results in a darkening of a glass with a commensurate decrease in visible light transmission. The method comprises adding components excluding sodium nitrate and mixing and melting he components to form the glass composition disclosed above. These and other advantages of the present invention will become apparent from the detailed description. Commercially, it is expected that the glass would be manufactured by the well known float glass process, although the manufacture of the invention glass is not so limited.

DETAILED DESCRIPTION OF THE INVENTION

Flat soda-lime-silica glass, used in the automotive and architectural industries and conveniently made by the float glass process, is generally characterized by the following basic composition shown in Table I, the amounts of the components being based on a weight percentage of the total glass composition:

TABLE I

| Base Glass Components | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The dark bronze glass composition of the present invention employs this basic soda-lime-silica glass composition wherein, additionally, CaO+MgO is 6 to 15% and $Na_2O+K_2O$ is 10 to 20%. In addition, the coloring components of the dark bronze glass composition consist essentially of: greater than 0.5 to 1.5 wt. % total iron oxide as $Fe_2O_3$, wherein the ratio of wt. % FeO/wt. % total iron as $Fe_2O_3$ is below 0.26; 0.1 to 1.0 wt. % manganese oxide as $MnO_2$; 0.0005 to 0.004 wt. % selenium as Se; 0.0 to 0.016 wt. % cobalt oxide as Co; and 0–1.0 wt. % $TiO_2$.

Further, the glass considered at a 4.0 mm. thickness has the following spectral properties: 570 to 585 dominant wavelength, 5 to 30% purity of excitation, 20 to 65% light transmittance using Illuminant A (LTA). More particularly, at an % LTA of 20–50%, the excitation purity is 7%–30% in order to provide the bronze color to the invention glass. Above 50% LTA, to provide glass of the invention would have a bronze color with an excitation purity from 5–20%. As the excitation purity increases, the bronze color becomes more intense. Further the invention glass has at this thickness less than 35% ultra violet (UV) transmittance measured over the range of 300 to 400 nanometers and less than 46% infra red (IR) transmittance measured over the range of 760 to 2120 nanometers. All of the examples herein use these wavelength ranges for the UV and IR transmittance at 4.0 mm. control thickness.

Generally, as the quantities of the colorants increase for a given thickness of glass, the % LTA, % UV and % IR transmittance will go down. Conversely, as the glass thickness increases for a given glass composition, the LTA, UV, and IR transmittance of the thicker glass decreases. Preferably, the dominant wavelength is between 577 and 582 nanometers, more preferably from 579 to 581.

To manufacture the glass, the components are mixed and melted to form a molten composition which is then formed into the glass product, as for example by floating on a tin bath to make glass sheets. As would be known in the art, melting and refining aids are routinely included in glass manufacture and may also be used herein. One refining aid generally used to remove bubbles from the glass is sodium sulfate which results in $SO_3$ in the glass. Preferably $SO_3$ is present in the glass composition at 0.10 to 0.30 wt. %, more preferably 0.14 to 0.25 wt. %.

One required colorant, iron oxide as total iron oxide as $Fe_2O_3$ is present in the invention bronze glass composition in quantities of greater than 0.5 and up to and including 1.5 wt. %, preferably being 0.6 to 1.2 wt. %, more preferably being 0.7 to 0.95 wt. %. In order to maintain the spectral properties of the invention glass as described herein, the ratio of wt. % FeO/wt. % total iron as $Fe_2O_3$ is below 0.26 in the glass. All weight percents herein being based on the total weight of the dark bronze invention glass composition. Typically, this colorant is added into the batch ingredients in the oxide form, $Fe_2O_3$. Iron oxide exists in the glass in two forms. The oxidized form of iron oxide ($Fe_2O_3$) absorbs ultraviolet light and the reduced form of iron oxide absorbs (FeO) infrared light, hence lowering the UV and IR transmittance through the glass products. Both absorbing functions of the iron oxide are especially valuable when the glass product is used in architectural applications particularly in geographic areas having significant sunshine. The ratio of the reduced to the total iron oxide, FeO/total iron as $Fe_2O_3$, is called the redox ratio of the iron oxide. In the present bronze glass it is preferably from 0.14 to below 0.26, more preferably being from 0.20 to 0.25. The optimal redox ratio in the final product is determined by the particular spectral properties of the desired glass.

Adding iron oxide to the glass under normal furnace conditions in a typical soda-lime-silica glass improves both the ultraviolet (UV) and the infrared absorption (IR) of the glass since the concentration of the iron forms is correspondingly increased, but this improvement is at the expense of visible transmittance. That is, as iron oxide is added the color of the glass darkens so that the visible transmittance is correspondingly decreased. As discussed herein, the present invention glass composition affords inclusion of more iron oxide to improve UV and IR absorption without a commensurate reduction of visible light transmittance. Thus, the present glass composition is able to attain excellent UV properties without the costly additives often used in other glass compositions for this purpose like titanium oxide, chromium oxide, cerium oxide or vanadium pentoxide. However, titanium oxide may be added if desired to further improve the UV absorbing properties for special applications, i.e., in amounts up to about 1.0% by weight.

Another essential colorant in the bronze glass composition is a manganese compound, such as $MnO_2$. The manganese compound is present in the invention composition in an amount of 0.10 to 1.0 wt. % based on $MnO_2$, more preferably being 0.2 to 0.8 wt. %. This manganese compound can be added to the batch glass components in a variety of forms, for example, but not limited to, $MnO_2$, $Mn_3O_4$, MnO, $MnCO_3$, $MnSO_4$, $MnF_2$, $MnCl_2$, etc. Preferably it is most desirable to use the manganese oxide or manganese carbonate compounds in the batch. As would be appreciated, a mixture of such compounds may also be employed. A naturally occurring mineral, pyrolusite, can also be used to supply manganese dioxide to the batch because the impurities within the mineral deposits are also found in glass such as $Fe_2O_3$, $Al_2O_3$, $SiO_2$, BaO, and CaO. Pyrolusite thus can effectively be used in the batch mixture as the source of manganese oxide at a significant savings in batch cost.

In the glass composition, this manganese compound colorant is generally present in the $Mn^{+2}$ and $Mn^{-3}$ state, although it may additionally be present in other states such as $Mn^{+4}$. Since one form of manganese oxide absorbs in the same area as selenium colorant, less of the costly selenium colorant can be used while providing the desired dark bronze glass color. Selenium is also known to be easily volatilized from the glass melt. Manganese oxide, e.g., on the other hand, is inexpensive and not subject to such volatility so that it is optimal as a colorant in the present bronze glass composition.

The manganese oxide colorant, in addition to being able to replace a portion of the selenium colorant, we believe is functional to also shift the iron oxide towards its less colored oxidized form, hence diminishing the amount of iron oxide in the more colored reduced iron oxide form. At the same time the manganese compound is shifted towards the more colorless form. This other function of manganese oxide colorant allows we believe for more iron oxide to be added to enhance the UV and IR absorbing properties of the glass without compromising visible transmittance. While this theory has been advanced to explain some of the improved spectral properties of the present bronze glass composition, neither its accuracy nor understanding is necessary for the practice of the present invention.

We have found that the use of the manganese oxide colorant, which additionally provides oxidizing benefits, allows the elimination of sodium or potassium nitrate as a raw material component in the manufacture of the present invention bronze glass. These nitrates are conventionally added during glass manufacturing to control the oxidizing characteristics of the glass melt. The inclusion of sodium nitrate (or potassium nitrates) can lead to generation of undesirable nitrogen oxide (NOx) emissions. In addition, we have found that when sodium nitrate is used in the batch, sodium sulfate (a fining agent) must be lowered which may adversely affect the fining action of sodium sulfate. While this invention composition is not required to exclude the use of nitrates in its manufacture according to the broadest embodiment, we prefer to limit or exclude the addition of nitrates to the glass melt during processing. In general, if sodium nitrate is included in the present composition, it would optimally be in an amount less than 5 pounds per 1000 pounds of sand. Manganese oxide colorant, while also allowing adjustment in the batch of the oxidation state of iron oxide, is believed to permit the use of anthracite coal to enhance the decomposition of sodium sulfate and improving the fining (removal of gaseous inclusions) characteristics of the glass batch. Normally, one skilled in the art of glass making would not use a batch mixture containing a material such as manganese oxide which has oxidizing properties together with a reducing agent such as anthracite coal. A particularly preferred embodiment of the instant invention is thus combining in the batch manganese oxide with anthracite coal or other like reductants such as graphite, slag from coal fired furnaces, blast furnace slag, coke, or the carbonaceous materials. In theory, increasing manganese oxide will cause the iron oxide equilibrium in the melt to shift toward the oxidized form of the iron while the reductant reacts with the sodium sulfate to decompose into sodium oxide that becomes a part of the glass and sulfur trioxide that provides the fining action at lower temperatures. Sodium sulfate requires higher melting temperatures when a reductant is absent in the batch. We have found that the use of a reducing agent in the batch permits lower furnace operating temperatures while making a glass product with the same quality as glass made without the reductant at those higher temperatures. This methodology has significant commercial and environmental benefits.

As discussed above, the present invention composition advantageously provides a dark bronze glass with good UV and IR absorbance, while at the same time maintaining desired visible transmittance. For example, a commercially available bronze glass including iron oxide colorant has a UV transmittance of about 42.8% and an IR transmittance of 55.6% at 63.4% LTA. In contrast, a present invention bronze glass embodiment with a deeper bronze color can be made having at a minimally lowered 58.9% LTA, while at the same time, a significantly lowered UV transmittance of 34.6% and IR transmittance of 45.7%. The advantage of the spectral properties of the present invention glass for architectural applications is readily apparent.

The glass composition also includes selenium as a colorant in an amount from 0.0005 to 0.004 wt. % as Se which is an essential ingredient for the bronze color because selenium has a maximum absorption about 500 nanometers and also combines with iron oxide to form an iron-selenium complex with a stronger absorption peak at about 490 nanometers. Manganese oxide in the $Mn^{+3}$ form also has an absorption peak about 490 nanometers so that as discussed above manganese oxide can partially replace selenium coloration in the composition and provide the absorption needed for the bronze color of the glass. Selenium can be added to the glass in a variety of manners including: the elemental metal and in any compound form such as sodium selenite, barium selenite, selenium oxide, sodium selenate, etc.

Cobalt may also be used as a colorant in the present invention dark bronze glass, however, it is not required. When added, it is typically added to the batch ingredients as an oxide thereof, and is present as a coloring component in the glass in an amount of 0.0 to 0.016 wt. % as Co, preferably in an amount of 0.0 to 0.009 wt. %. The cobalt functions to absorb light in the 580 to 680 nanometer range of the visible spectrum. Cobalt has the ability to lower the % LTA, when desired, and to balance the amount of absorption from Se, $MnO_2$ and both FeO and $Fe_2O_3$ to achieve the desired dark bronze appearance of the present glass composition.

The glass may also include titanium oxide in an amount up to about 1.0 wt. % added as an optional additive to further enhance the UV absorbing properties of the dark bronze glass should it be desired for the intended applications. As discussed above, the present invention glass has improved UV and IR absorption properties and therefore generally it would not be added to the composition. The glass may also include tramp materials which sometimes enter the glass with raw materials or as a result of changeover of one glass composition to another in a glass furnace. Titanium dioxide often enters glass compositions as a tramp material or impurity with raw materials when making soda-lime-silica glass compositions, e.g., with the sand, dolomite or limestone. The level of tramp impurity of titanium dioxide that generally is present ranges normally from about 0.015 to about 0.05 wt. %, depending of the source of the individual raw materials. Other raw materials may, however, not include any of this impurity. It is known that tramp materials may also enter the glass batch from changeover of the glass melting furnaces from one composition to another. These tramp materials or impurities are expected to be in small amounts, e.g., up to 0.005 wt. % nickel oxide as NiO. While nickel in glass has been known to be less than desirable as discussed above because of the opportunity to form nickel sulfide stones, we have found that the use of manganese oxide in the glass manufacturing also reduces nickel sulfide stone formation (U.S. patent application Ser. No. 08/691, 958). Still other tramp materials that might be included will be apparent to those skilled in the art in view of the present disclosure, such as chromium, cerium, molybdenum, to name a few.

The following table lists ingredients which are preferably used to form the embodiments of bronze glass compositions according to the present invention.

TABLE II

| BATCH MATERIALS | RANGE MASS (LBS.) |
| --- | --- |
| SAND | 1000 |
| SODA ASH | 290 TO 350 |
| DOLOMITE | 215 TO 260 |
| LIMESTONE | 70 TO 90 |
| SALT CAKE | 6 TO 24 |
| ROUGE (97% $Fe_2O_3$) | 5 TO 22 |
| MANGANESE DIOXIDE | 1.3 TO 13 |
| COBALT OXIDE ($Co_3O_4$) | 0.0 TO 0.28 |
| SELENIUM | 0.08 TO 0.5 |
| CARBOCITE | 0 TO 2 |
| NEPHELINE SYENITE | 0 TO 150 |

To manufacture glass, the component materials are mixed and melted in a furnace at a sufficient temperature, generally about 1500° C. As is known in the art, to form sheet glass in commercial production, the float glass method is generally used. Generally the glass composition would be manufactured by floating the molten composition on a tin bath as well known in the art of glass making. As appreciated, such commercial production involves continuous batch processing. This molten glass is refined and subsequently formed, e.g., into a glass sheet having a predetermined thickness by a float process or the like. Then, this glass sheet is cut into a predetermined size obtain glass sheets.

The invention bronze glass may also be coated with materials to further enhance the color or spectral properties like reflectance, e.g., with materials like chrome oxide, iron oxide, cobalt oxide, or titanium oxide. Still other coatings which may be applied to glass for these purposes would be apparent to those skilled in the art in view of the present disclosure.

While the bronze glass may be manufactured with the use of nitrates, preferably as discussed above, a preferred embodiment manufacturing method does not use any nitrates. The following examples employ this preferred way of manufacturing without nitrates. It is unexpected and most desirable that the bronze glass composition can be manufactured without the use of the commonly employed oxidant, sodium nitrate. We believe that the use of the colorant manganese compound allows for the manufacture of the glass without the addition of sodium nitrate since the manganese compound colorant is also able to provide suitable oxidizing conditions. The fact that the manganese compounds like manganese dioxide are relatively inexpensive provides further commercial desirability to the present invention. We believe that the oxidizing property of manganese dioxide allows keeping the redox ratio (wt. % FeO/total iron as wt. % $Fe_2O_3$.) below the required 0.26 ratio without the need of other oxidizing agents.

Bronze glass compositions made according to the present invention can be used for architectural applications although they can be used for other applications as well, e.g., for privacy glasses in automotive vehicles if desired. Glasses containing manganese and iron oxides have been known to solarize or discolor when exposed to a strong ultra violet light source. Glasses of the present invention have been found not to experience any appreciable solarization.

The following examples display embodiments of the present invention. In the laboratory, for example purposes, glass melts were prepared according to the following procedure: batches were weighed, placed into a glass jar about 2" high and 2" inside diameter and dry mixed for 10 minutes each on a Turbula mixer, dry batch was placed into an 80% platinum/20% rhodium crucible that stands 2" tall and has an inside diameter at the top of 2.5' and is tapered to the base which has an inside diameter of 1.75". An amount of 4.5 ml.

of water is added to the dry batch in the crucible and mixed with a metal spoon. After such preparation, a group of six different batches is melted in a gas/air fired furnace at the same time for 1 hour at 2600° F. and each crucible is removed in turn from the furnace and fritted. Friting the glass involves coating the inside of the platinum/rhodium crucible with the molten glass and then plunging the crucible into cold water.

After removing the crucible from the water and draining the water, the broken glass particles are removed from the sides of the crucible and mechanically mixed inside the crucible. All six samples are fritted in like manner and all crucibles are placed back into the furnace for another 1 hour interval at 2600° F. and the fritting procedure is repeated. After the second fritting process, the crucibles are returned to the furnace for 4 hours at 2600° F. Each crucible is removed in turn from the furnace and each molten glass sample is poured into a graphite mold with an inside diameter of 2.5". Each glass is cooled slowly, labeled, and placed into an annealing furnace where the temperature is quickly raised to 1050° F., held for 2 hours, and then slowly cooled by shutting off the furnace and removing the samples after 14 or more hours. The samples are ground and polished to about 4.0 mm. thickness and subsequently the spectral properties are measured for each sample.

All the laboratory melts made with the above procedure use a base composition of 100 grams sand, 32.22 grams of soda ash, 8.81 grams of limestone, 23.09 grams of dolomite, 1.2 grams of sodium sulfate, 0.075 grams of carbocite, 2.64 grams of nepheline syenite, and the remainder of the batch includes rouge, selenium, manganese dioxide and cobalt oxide in some example melts. Sodium nitrate was not included as a component in any of the examples.

Table III shows the improvement of the ultra violet and infra red absorption of embodiments of present invention glass compositions as the iron oxide is increased and is shifted to its oxidized form by the addition of varying amounts of manganese dioxide. All of the examples display the calculated quantities of each colorant from the batch. For comparison, Example 1 is a comparative example of a commercially made product available from Ford Motor Company called Sunglas® Bronze.

TABLE III

|  | Ex. 1 | Ex. 2 | Ex. 3 | Ex. 4 | Ex. 5 | Ex. 6 | Ex. 7 |
|---|---|---|---|---|---|---|---|
| Wt. % $Fe_2O_3$ | 0.36 | 0.50 | 0.60 | 0.60 | 0.70 | 0.70 | 0.80 |
| Wt. % FeO | 0.078 | 0.106 | 0.124 | 0.123 | 0.141 | 0.143 | 0.143 |
| ppm Se | 17 | 20 | 25 | 24 | 17 | 29 | 11 |
| ppm Co | 25 | 30 | 35 | 39 | 41 | 41 | 59 |
| Wt. % $MnO_2$ | None | 0.20 | 0.20 | 0.20 | 0.40 | 0.20 | 0.80 |
| % LTA | 63.4 | 58.9 | 54.3 | 53.3 | 50.7 | 47.6 | 44.8 |
| % LTC | 62.6 | 58.3 | 53.7 | 52.5 | 50.2 | 46.7 | 44.4 |
| % UV | 42.8 | 34.6 | 29.7 | 29.3 | 25.0 | 22.8 | 17.9 |
| % IR | 55.6 | 45.7 | 40.5 | 40.6 | 36.4 | 36.0 | 35.6 |
| % TSET | 58.4 | 51.4 | 46.5 | 46.1 | 42.5 | 40.8 | 39.4 |
| Dominant Wavelength | 580.5 | 576.1 | 575.9 | 577.3 | 574.5 | 578.0 | 572.8 |
| % Excitation Purity | 5.7 | 6.0 | 7.1 | 8.2 | 8.1 | 11.6 | 9.0 |

From Table III, it can be readily seen that the addition of manganese dioxide together with the increased iron oxide significantly improves both the ultra violet and infra red absorption of the present invention bronze glass composition. Most desirably, in addition to the significant improvement in the ultra violet absorption of the glass, the invention also lowers the visible transmittance of the glass, as evidenced by % LTA. Examples 2 through 7 shows the increase in bronze color intensity associated by the higher % excitation purity obtained by increasing the concentration of the colorants. Note also in Example 7 that while the manganese dioxide is increased over that of Example 6, the selenium can be significantly lowered and while the % LTA, % LTC, and % UV are lowered, the % IR and % TSET are virtually maintained equivalent.

Table IV shows other examples of glasses where the ultra violet and infra red absorption has been improved. In Tables III, IV, and V, no $TiO_2$ was added to the glass, but it was present as an impurity in the glass at a level of about 0.02 wt. %, having come in with raw materials.

TABLE IV

|  | Ex. 8 | Ex. 9 | Ex. 10 | Ex. 11 | Ex. 12 | Ex. 13 |
|---|---|---|---|---|---|---|
| Wt. % $Fe_2O_3$ | 0.81 | 0.91 | 0.91 | 1.08 | 1.28 | 1.28 |
| Wt. % FeO | 0.164 | 0.178 | 0.183 | 0.157 | 0.254 | 0.315 |
| ppm Se | 33 | 36 | 24 | 27 | 19 | 14 |
| ppm Co | 47 | 54 | 61 | 157 | 74 | 63 |
| Wt. % $MnO_2$ | 0.20 | 0.20 | 0.20 | 0.48 | 0.39 | 0.30 |
| % LTA | 42.5 | 38.6 | 39.6 | 23.0 | 32.1 | 23.2 |
| % LTC | 41.4 | 37.4 | 38.9 | 22.7 | 31.7 | 23.1 |
| % UV | 18.4 | 14.9 | 17.5 | 7.4 | 9.2 | 7.7 |
| % IR | 31.3 | 28.7 | 27.7 | 35.2 | 42.2 | 11.4 |
| % TSET | 35.8 | 32.6 | 32.9 | 30.0 | 24.6 | 16.5 |
| Dominant Wavelength | 578.4 | 578.9 | 576.6 | 576.6 | 572.9 | 570.9 |
| % Ex. Purity | 14.3 | 17.8 | 8.8 | 8.8 | 14.8 | 11.8 |

The results of Table IV, for embodiments of present invention glass compositions, demonstrate again that increasing the $Fe_2O_3$, correspondingly increases the ultra violet absorption. Table IV also shows that at as the concentration of $MnO_2$ is increased, the ultra violet absorption is further increased by a significant amount. As both manganese oxide and iron oxide is increased, the infra red absorption is also improved while maintaining the bronze color. Note in Example 11, the high concentration of cobalt with its strong absorption in the blue portion of the spectrum is offset by the high concentrations of both selenium and manganese dioxide to maintain a bronze color in the glass.

Table V further demonstrates the ultra violet absorption and infra red improvements attained when both $MnO_2$ and $Fe_2O_3$ are steadily increased according to embodiments of the present invention.

TABLE V

|  | Ex. 14 | Ex. 15 | Ex. 16 | Ex. 17 | Ex. 18 | Ex. 19 |
|---|---|---|---|---|---|---|
| Wt. % $Fe_2O_3$ | 1.28 | 1.42 | 1.47 | 1.47 | 1.48 | 1.49 |
| Wt. % FeO | 0.311 | 0.213 | 0.263 | 0.318 | 0.302 | 0.278 |
| ppm Se | 17 | 23 | 15 | 30 | 20 | 19 |
| ppm Co | 55 | 149 | 85 | 0 | 40 | 86 |
| Wt. % $MnO_2$ | 0.40 | 0.20 | 0.49 | 0.20 | 0.40 | 0.23 |
| % LTA | 22.7 | 21.8 | 29.5 | 44.4 | 35.2 | 22.5 |
| % LTC | 22.3 | 21.6 | 29.2 | 43.5 | 34.7 | 21.5 |
| % UV | 6.3 | 6.7 | 6.4 | 10.5 | 7.8 | 4.8 |
| % IR | 11.6 | 22.6 | 20.2 | 15.8 | 16.7 | 18.4 |
| % TSET | 16.2 | 22.6 | 22.8 | 24.8 | 22.4 | 19.1 |
| Dominant Wavelength | 573.8 | 572.2 | 571.7 | 573.1 | 571.9 | 578.5 |
| % Excitation Purity | 17.4 | 8.5 | 17.1 | 22.0 | 19.4 | 29.0 |

Example 17 from Table V represents an important embodiment of the present invention wherein the cobalt has been removed and an intense bronze color, evidenced by the high % excitation purity, is generated by small quantities of manganese dioxide and selenium while the visible transmittance is increased. When low concentrations of cobalt or no cobalt is used in the present invention, smaller quantities of manganese oxide and selenium are required to generate the bronze color and the ultra violet and infra red absorption is still improved while a higher visible transmittance is obtained.

While certain embodiments of the invention have been described above, it is expected that other variation as are known to those skilled in the art may be resorted to without departing from the scope of the invention as defined by the claims that follow.

We claim:

1. A dark bronze ultra violet and infra red absorbing glass composition comprising by total weight of the composition: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: greater than 0.5 to 1.5 wt. % total iron oxide as $Fe_2O_3$, wherein the ratio of wt. % FeO/wt. % total iron as $Fe_2O_3$ is below 0.26; 0.10 to 1.0 wt. % manganese oxide as $MnO_2$; 0.0005 to 0.004 wt. % selenium; 0.0 to 0.016 wt. % cobalt oxide as Co; and 0–1.0 wt. % $TiO_2$; the glass having at a 4.0 mm. thickness: 570–585 dominant wavelength, less than 35% ultraviolet transmittance measured over 300–400 nm, less than 46% infra red transmittance measured over 760–2120 nm, with 20–65% light transmittance using Illuminant A (LTA), wherein up to 50% LTA the excitation purity of the glass is 7–30%, and above 50% LTA, the excitation purity of the glass is 5–20%.

2. The bronze glass composition according to claim 1 wherein the dominant wavelength is between 577 and 582 nanometers.

3. The bronze colored glass composition according to claim 1 wherein the amount of said total iron expressed as $Fe_2O_3$ is 0.6 to 1.2 wt. %.

4. The bronze glass composition according to claim 1 wherein the amount of manganese oxide expressed as $MnO_2$ is 0.2 to 0.8 wt. %.

5. The bronze colored glass composition according to claim 1 wherein the amount of said total iron expressed as $Fe_2O_3$ is 0.7 to 0.95 wt. %.

6. The bronze glass composition according to claim 1 wherein the amount of said cobalt oxide as Co is within the range of 0.0 to 0.009 wt. %.

7. The bronze glass composition according to claim 1 wherein the dominant wavelength is between 579 and 581 nanometers.

8. A bronze ultra violet and infra red absorbing glass composition comprising by total weight of the composition: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: 0.7 to 0.95 wt. % total iron oxide as $Fe_2O_3$, wherein the ratio of wt. % FeO/wt. % total iron as $Fe_2O_3$ is below 0.26; 0.20 to 0.8 wt. % manganese oxide as $MnO_2$; 0.0005 to 0.004 wt. % selenium; 0.0 to 0.016 wt. % cobalt oxide as Co; and 0–1.0 wt. % $TiO_2$; the glass having at a 4.0 mm. thickness: 579–581 dominant wavelength, 5–30% purity of excitation, less than 35% ultraviolet transmittance measured over 300–400 nm, less than 46% infra red transmittance measured over 760–2120 nm, with 20–65% light transmittance using Illuminant A (LTA), wherein up to 50% LTA the excitation purity is 7–30%, and above 50% LTA, the excitation purity is from 5–20%.

9. The bronze glass composition according to claim 1 being manufactured without the addition of sodium nitrate as a raw material component.

10. An architectural glass made from the composition of claim 1 wherein the glass was floated on a molten tin bath.

11. An architectural glazing made from the composition of claim 1, wherein a coating has been applied to the glass.

* * * * *